US010493826B2

(12) United States Patent
Schwarz et al.

(10) Patent No.: US 10,493,826 B2
(45) Date of Patent: Dec. 3, 2019

(54) MOTOR VEHICLE DEVICE COMPRISING A MOVABLE WINDOWPANE, MOTOR VEHICLE COMPRISING A MOTOR VEHICLE DEVICE OF THIS TYPE, AND METHOD FOR OPERATING A MOTOR VEHICLE DEVICE OF THIS TYPE

(71) Applicant: GM GLOBAL TECHNOLOGY OPERATIONS LLC, Detroit, MI (US)

(72) Inventors: Romina Schwarz, Ruesselsheim (DE); Christian Tabbert, Ruesselsheim (DE); Michael Linden, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 192 days.

(21) Appl. No.: 15/622,240

(22) Filed: Jun. 14, 2017

(65) Prior Publication Data

US 2017/0361685 A1 Dec. 21, 2017

(30) Foreign Application Priority Data

Jun. 15, 2016 (DE) .................. 10 2016 007 357

(51) Int. Cl.
*E05F 15/00* (2015.01)
*B60J 1/17* (2006.01)
*E05F 15/60* (2015.01)

(52) U.S. Cl.
CPC ............. *B60J 1/17* (2013.01); *E05F 15/60* (2015.01); *E05Y 2400/854* (2013.01); *E05Y 2400/86* (2013.01); *E05Y 2900/55* (2013.01)

(58) Field of Classification Search
CPC .......... E05Y 2400/85; E05Y 2400/854; E05Y 2400/86; E05Y 2900/55; B60J 1/17; E05F 15/686; E05F 15/60
See application file for complete search history.

(56) References Cited

U.S. PATENT DOCUMENTS

| | | | | |
|---|---|---|---|---|
| 5,661,385 A | * | 8/1997 | McEwan | G01S 13/0209 318/478 |
| 5,760,554 A | | 6/1998 | Bustamante | |
| 6,157,372 A | | 12/2000 | Blackburn | |
| 6,657,140 B2 | | 12/2003 | Rantet | |
| 7,002,089 B2 | | 2/2006 | Stevenson | |
| 7,410,202 B2 | | 8/2008 | Rose et al. | |
| 8,143,832 B2 | | 3/2012 | Holzmann | |
| 10,233,686 B2 | * | 3/2019 | Smith | E05F 15/695 |

(Continued)

FOREIGN PATENT DOCUMENTS

| | | |
|---|---|---|
| EP | 1515211 A1 | 3/2005 |
| EP | 2639121 A3 * | 4/2018 |

(Continued)

*Primary Examiner* — Jerry E Redman
(74) *Attorney, Agent, or Firm* — Lorenz & Kopf, LLP

(57) ABSTRACT

A motor vehicle device includes a movable windowpane, which can be moved into a first end position, and an actuation mechanism having a touch-sensitive surface and by which a sliding movement of an operating element on the surface can be detected. The actuation mechanism cooperates with a drive of the windowpane in such a way that the windowpane is moved into the first end position when a sliding movement occurring at least in part in a predetermined first movement direction is detected.

15 Claims, 2 Drawing Sheets

(56) References Cited

U.S. PATENT DOCUMENTS

| | | | |
|---|---|---|---|
| 10,329,829 B2* | 6/2019 | Matsui | E05F 15/73 |
| 2003/0001724 A1* | 1/2003 | Willats | E05B 53/001 |
| | | | 340/5.72 |
| 2003/0047430 A1 | 3/2003 | Rantet | |
| 2006/0191204 A1* | 8/2006 | Herwig | B60J 5/06 |
| | | | 49/28 |
| 2007/0182215 A1* | 8/2007 | Rose | B60R 16/005 |
| | | | 296/211 |
| 2007/0255468 A1 | 11/2007 | Strebel et al. | |
| 2008/0302014 A1 | 12/2008 | Szczerba | |
| 2009/0295556 A1 | 12/2009 | Inoue | |
| 2013/0187889 A1 | 7/2013 | Pandher | |
| 2013/0283692 A1* | 10/2013 | Zawade | B60R 21/01546 |
| | | | 49/31 |
| 2014/0000165 A1* | 1/2014 | Patel | E05B 81/76 |
| | | | 49/31 |
| 2017/0057357 A1* | 3/2017 | Borghi | B60K 37/06 |
| 2017/0260795 A1* | 9/2017 | Jergess | E05F 15/632 |
| 2017/0357438 A1* | 12/2017 | Dixon | G06F 17/276 |
| 2017/0361685 A1* | 12/2017 | Schwarz | E05F 15/60 |
| 2018/0337870 A1* | 11/2018 | Schubert | H04L 51/02 |
| 2019/0005755 A1* | 1/2019 | Snider | G07C 9/00857 |
| 2019/0171024 A1* | 6/2019 | Tumler | G02B 27/017 |
| 2019/0189087 A1* | 6/2019 | Helot | B60K 35/00 |
| 2019/0197053 A1* | 6/2019 | Graham | G06F 16/634 |

FOREIGN PATENT DOCUMENTS

| | | | | |
|---|---|---|---|---|
| WO | WO-2018002186 A1 * | 1/2018 | | B60K 35/00 |
| WO | WO-2019034466 A1 * | 2/2019 | | B60K 35/00 |

* cited by examiner

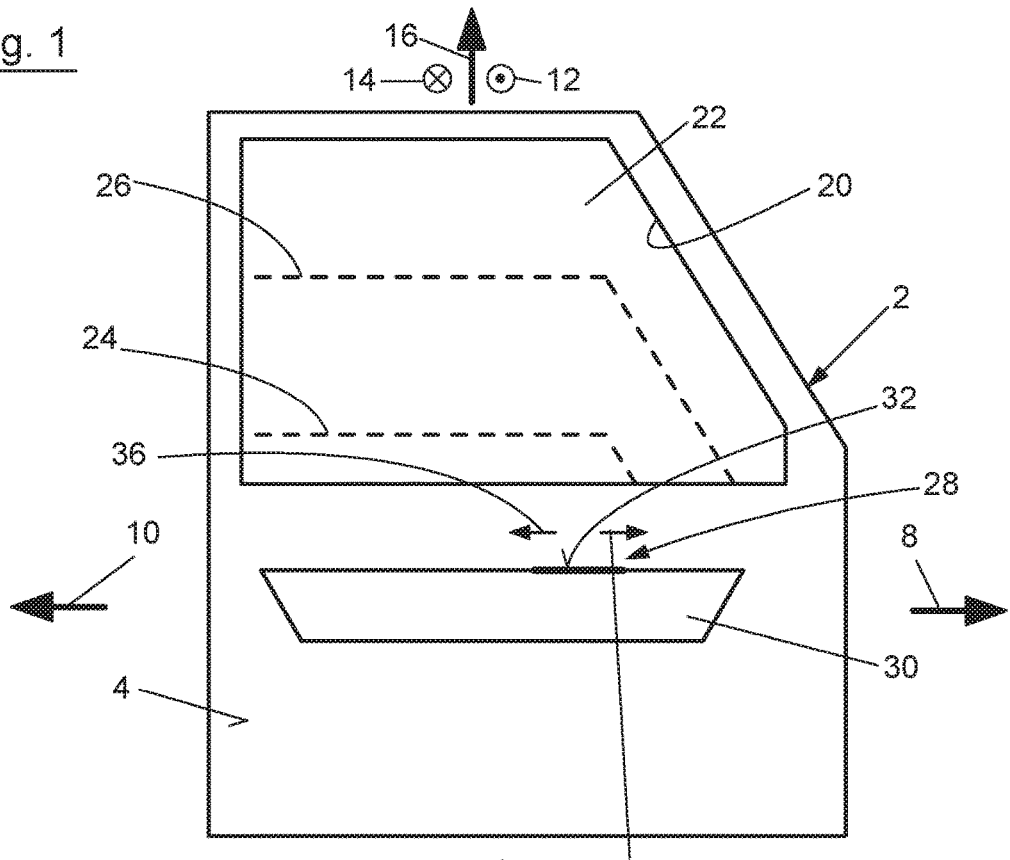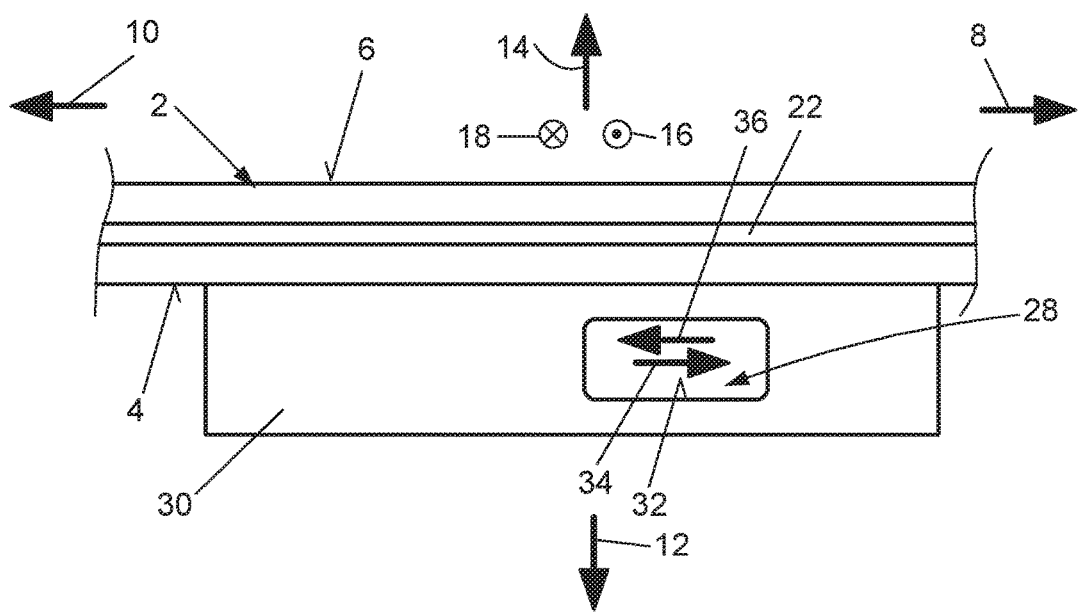

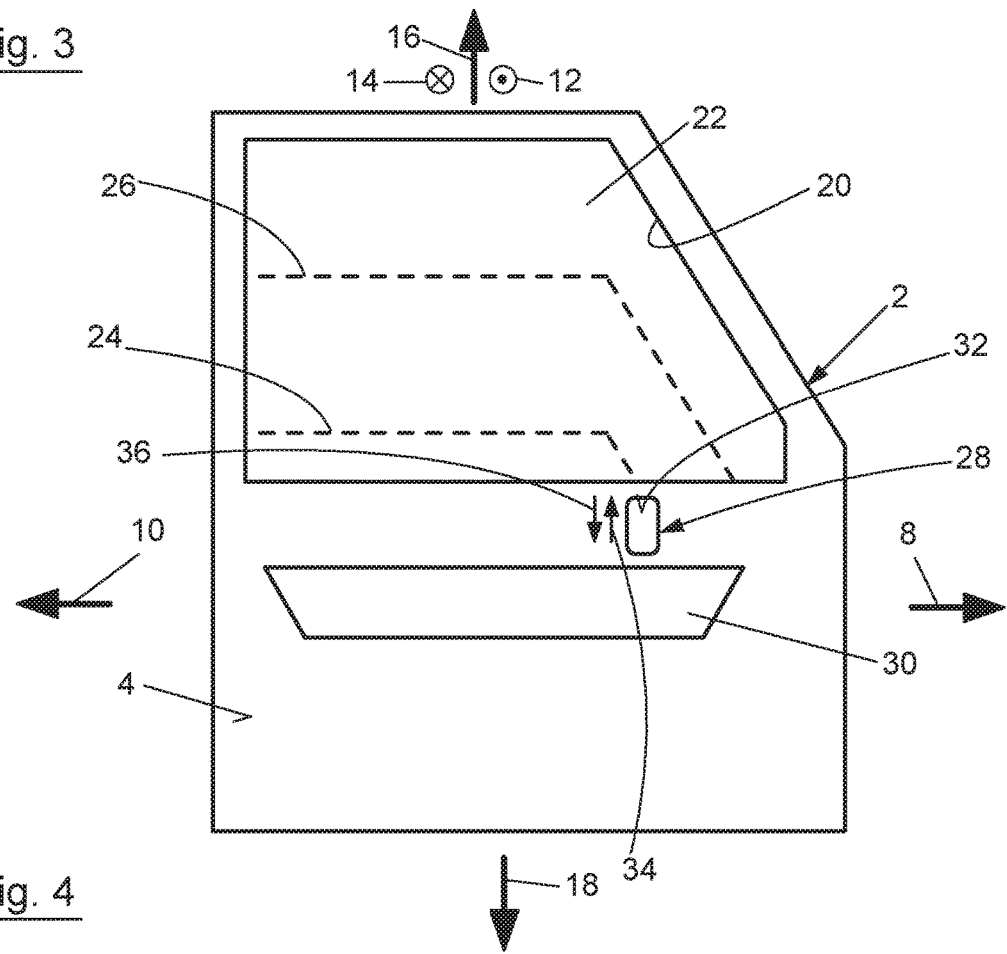
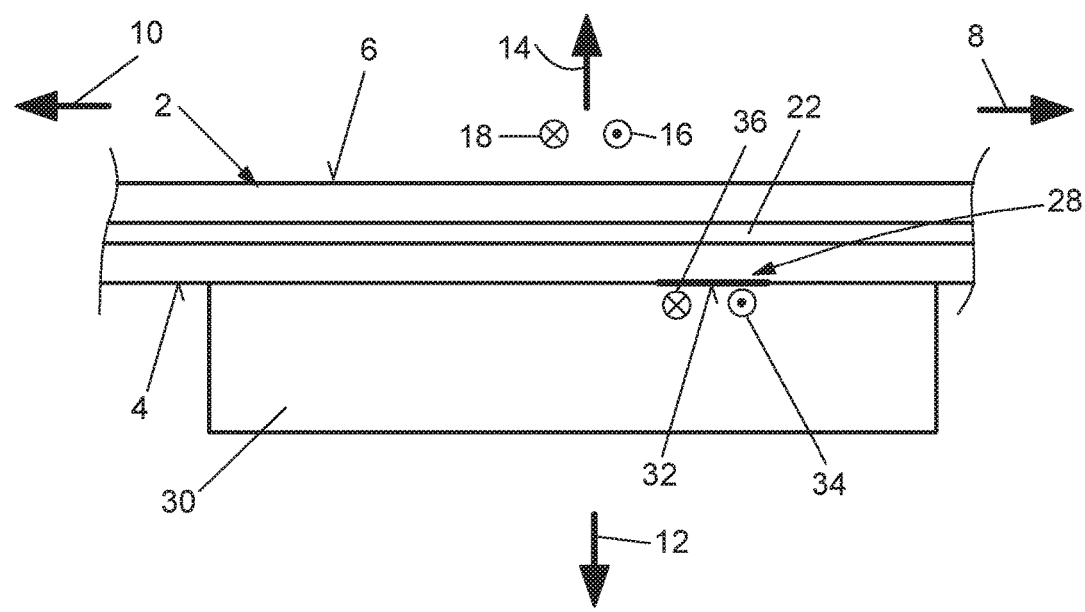

MOTOR VEHICLE DEVICE COMPRISING A MOVABLE WINDOWPANE, MOTOR VEHICLE COMPRISING A MOTOR VEHICLE DEVICE OF THIS TYPE, AND METHOD FOR OPERATING A MOTOR VEHICLE DEVICE OF THIS TYPE

CROSS-REFERENCE TO RELATED APPLICATION

This application claims priority to German Patent Application No. 102016007357.8, filed Jun. 15, 2016, which is incorporated herein by reference in its entirety.

TECHNICAL FIELD

The technical field relates to motor vehicle devices including a window pane, which is movable into a first end position, and including an actuation mechanism. The actuation mechanism cooperates with a drive of the windowpane in such a way that, by actuating the actuation mechanism, the windowpane can be moved into the first end position. The technical field also relates to motor vehicles including a motor vehicle device of this type, and to a method for operating a motor vehicle device of this type.

BACKGROUND

Motor vehicle devices for motor vehicles, which motor vehicle devices have a movable windowpane and a rocker switch. The rocker switch cooperates with a drive of the windowpane in such a way that the windowpane can be moved into a first end position, for example an open position or a closed position, by actuating the rocker switch. The rocker switch, which is arranged in a starting position, and if pressed down at one end thereof by an operating individual, the windowpane is thus moved by the drive into the aforementioned first end position. If, by contrast, the operating individual presses down the other end of the rocker switch, the windowpane is thus moved by the drive into a second end position, which is opposite the first end position. If the operating individual removes his finger from the rocker switch, the windowpane can thus be stopped in an intermediate position between the first and second end positions. If the operating individual presses the rocker switch at one end or another thereof for a minimum period of time, the windowpane is automatically moved into the particular end position even once the finger belonging to the operating individual has been removed.

Such rocker switches as an actuation mechanism of the motor vehicle device have proven their worth, but still have some disadvantages. Firstly, it should be noted that the rocker switches often protrude annoyingly from an interior trim of the motor vehicle. Even if the rocker switches are arranged in a recessed manner in the interior trim, they still require a relatively large installation space. In addition, the ends of the rocker switch must be contacted in a relatively precise manner in order to be able to move the windowpane into the particular end position. The handling of the motor vehicle device is made difficult as a result.

SUMMARY

According to the present disclosure an improvement is provided for a motor vehicle device of the above-described type to such an extent that the above-mentioned disadvantages are overcome. In addition, an advantageous method for operating a motor vehicle device of this type is disclosed.

One embodiment of the present disclosure relates to a motor vehicle device including a movable windowpane and an actuation mechanism. The movable windowpane can be moved at least into a first end position, which for example can be an open position, in which the windowpane releases an associated window opening to the largest possible extent, or a closed position, in which the associated window opening is completely closed by the windowpane. The actuation mechanism has a touch-sensitive surface, for example a touchpad. A sliding movement of a finger belonging to an operating individual on the touch-sensitive surface can be detected by the actuation mechanism. In so doing, the actuation mechanism cooperates with a drive, for example an electric motor, of the windowpane in such a way that the windowpane, in the event that a sliding movement occurring at least in part in a predetermined first movement direction is detected, is moved into the first position. Since there is no actuation mechanism in the form of a rocker switch provided in the motor vehicle device, and use is made instead of a touch-sensitive surface, not only is a space-saving design attained, but the handling of the motor vehicle device, and consequently the operation of the windowpane or actuation thereof, is also simplified, especially since a touch-sensitive surface does not have to be contacted in a targeted manner at a predetermined point in order to initiate the sliding movement.

In a further embodiment of the motor vehicle device according to the present disclosure, the windowpane can also be moved into a second end position, which is opposite the first end position, that is to say for example into the closed position or open position, as already explained further above. Here, the actuation mechanism cooperates with the drive of the windowpane in such a way that the windowpane, in the event that a sliding movement occurring at least in part in a second movement direction, which is opposite the first movement direction, is detected, is moved into the second end position. As a result of the two predetermined movement directions of the sliding movements opposite one another, an operating error is largely ruled out in particular, as occurs relatively frequently in the case of a rocker switch if the operating individual mistakenly presses down the incorrect end of the rocker switch. With this embodiment, a motor vehicle device that can be operated in a particularly comfortable manner is consequently created.

In a further embodiment of the motor vehicle device according to the present disclosure, the actuation mechanism cooperates with the drive in such a way that the windowpane is moved into the particular end position even if the contact with the surface or the sliding movement on the surface ends before the particular end position has been reached. In this way, the window opening associated with the windowpane can be opened or closed to the largest possible extent in a particularly comfortable manner, which simplifies the handling further still.

In order to be able to interrupt the aforementioned automatic complete opening or closing of the window opening associated with the windowpane, such that a desired intermediate position of the windowpane is reached, the actuation mechanism in a further embodiment of the motor vehicle device according to the present disclosure cooperates with the drive in such a way that, by tapping the surface, the windowpane is stopped in an intermediate position before the particular end position is reached.

In a further embodiment of the motor vehicle device according to the present disclosure, the windowpane can be moved into the end position at least at two different speeds. In addition, the actuation mechanism is also designed in such a way that the sliding speed of the sliding movement can be detected via the actuation mechanism. Here, the detection of the sliding speed of the sliding movement can be understood to mean both the detection of a qualitative value and the detection of a quantitative value. By way of example, various sliding speed ranges of the sliding movement can also be detected. In this embodiment, the actuation mechanism cooperates with the drive of the windowpane in such a way that the windowpane, in the event that a first sliding speed is detected, can be moved into the particular end position at a first speed, and, in the event that a second sliding speed, which is greater than the first sliding speed, is detected, can be moved into the particular end position at a second speed, which is greater than the first speed. As already mentioned above, significantly more different speeds of the windowpane can be defined here, and consequently a large number of different sliding speeds of the sliding movement can also be detected by the actuation mechanism. It can be advantageous in particular to define a number of successive sliding speed ranges in order to set a corresponding number of different speeds for the windowpane as a result.

In a further embodiment of the motor vehicle device according to the present disclosure which is based on the previously described embodiment, the speed of the windowpane becomes faster based on the sliding speed of the finger on the surface. Here, it is preferred if the speed of the windowpane can be adjusted continuously via the sliding speed of the sliding movement. In addition, it has proven to be advantageous in the case of this embodiment if a maximum speed is defined for the speed of the windowpane, independently of the sliding speed, which maximum speed is not exceeded, not even with an even faster sliding speed, in order to prevent an excessively rapid closing or opening of the windowpane.

In a further embodiment of the motor vehicle device according to the present disclosure, the touch-sensitive surface is formed as a touchpad. The touchpad can be formed as a capacitive, resistive or inductive touchpad as appropriate.

As already mentioned beforehand, in accordance with a further embodiment of the motor vehicle device according to the present disclosure, the windowpane assumes a closed or open position in the first end position and assumes the other position, i.e. the open or closed position, in the second end position.

One embodiment of the present disclosure also relates to a motor vehicle including a motor vehicle device according to an embodiment of the above-described motor vehicle device according to the present disclosure.

In a further embodiment of the motor vehicle according to the present disclosure, the predetermined first movement direction corresponds substantially to the forward direction of the motor vehicle or the vertical direction of the motor vehicle upwardly. Correspondingly, the predetermined second movement direction, which is opposite the first movement direction, in this embodiment would correspond substantially to the reverse direction of the motor vehicle or the vertical direction of the motor vehicle downwardly. It has been found that a particularly intuitive operation by the operating individual which is also less susceptible to errors is possible as a result.

In a further embodiment of the motor vehicle according to the present disclosure, the windowpane can be moved upwardly in the vertical direction of the motor vehicle into the first end position and/or is formed as a side windowpane of the motor vehicle. In this embodiment the windowpane is advantageously also movable downwardly in the vertical direction of the motor vehicle into the second end position.

A further embodiment of the present disclosure relates to a method for operating a motor vehicle device including a movable windowpane and an actuation mechanism having a touch-sensitive surface. In accordance with the method a sliding movement of a finger on the surface is detected and the windowpane is moved into a first end position when the sliding movement occurring at least in part in a predetermined first movement direction is detected. Alternatively or in addition, the windowpane may be moved into a second end position, which is opposite the first end position, when the sliding movement occurring at least in part in a second movement direction, which is opposite the first movement direction, is detected. With regard to the advantages of the method and embodiments thereof, reference is made to the previously described advantages of the motor vehicle device according to the present disclosure, which apply correspondingly.

In a further embodiment of the method according to the present disclosure, the windowpane is moved into the particular end position even if the contact with the surface or the sliding movement on the surface ends before the particular end position has been reached.

In a further embodiment of the method according to the present disclosure, the windowpane is stopped in an intermediate position before the particular end position has been reached, if the surface is tapped.

In a further embodiment of the method according to the present disclosure, the sliding speed of the sliding movement on the surface is also detected in order to move the windowpane into the particular end position at a first speed in the event that a first sliding movement is detected or in order to move the windowpane into the particular end position at a second speed, which is greater than the first speed, in the event that a second sliding speed, which is greater than the first sliding speed, is detected.

In a further embodiment of the method according to the present disclosure, the windowpane is moved all the more quickly, the greater is the detected sliding speed.

In a further embodiment of the method according to the present disclosure, the speed of the windowpane is adjusted continuously via the sliding speed.

In a further embodiment of the method according to the present disclosure, the speed of the windowpane is set via the sliding speed, but only up to a maximum speed.

BRIEF DESCRIPTION OF THE DRAWINGS

The present disclosure will hereinafter be described in conjunction with the following drawing figures, wherein like numerals denote like elements.

FIG. 1 shows a side view of a first embodiment of the motor vehicle device;

FIG. 2 shows a partial plan view of the motor vehicle device of FIG. 1;

FIG. 3 shows a side view of a second embodiment of the motor vehicle device; and FIG. 4 shows a partial plan view of the motor vehicle device of FIG. 3.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

FIGS. 1 and 2 show a first embodiment of a motor vehicle device. The motor vehicle device is integrated substantially in a motor vehicle wall 2, formed here as a motor vehicle door by way of example. The motor vehicle wall 2 has an inner side 4 facing towards the viewer or the motor vehicle interior and an outer side 6 facing away from the motor vehicle interior. The forward direction 8, the reverse direction 10, the transverse directions opposite one another 12, 14 and the vertical directions opposite one another 16, 18 of the motor vehicle are also indicated in the drawings on the basis of corresponding arrows when the motor vehicle wall 2 or the motor vehicle device is in the installed state.

A window opening 20 is formed in the motor vehicle wall 2. The window opening 20 is assigned a movable windowpane 22, which can be moved upwardly in the vertical direction 16 of the motor vehicle and downwardly in the vertical direction 18 of the motor vehicle. The windowpane 22 can thus be moved upwardly in the vertical direction 16 of the motor vehicle into a first end position, in which the windowpane 22 assumes a closed position. In other words, the window opening 20 in the closed position of the windowpane 22 is fully closed by the windowpane 22. The windowpane 22 is shown in FIGS. 1 and 2 in the first end position or in the closed position thereof. In addition, the windowpane 22 can be moved downwardly in the vertical direction 18 of the motor vehicle into a second end position, which is arranged opposite the first end position in the vertical direction 16, 18. In the second end position, the windowpane 22 assumes an open position, in which the window opening 20 is revealed by the windowpane 22 to the largest possible extent. In other words, the windowpane 22 is indicated in its second end position or open position on the basis of the dashed line 24. In addition, the windowpane 22 can also be moved between the first and second end position, i.e. between the closed position and the open position, into various intermediate positions. An intermediate position is indicated by way of example in FIG. 1 on the basis of the reference sign 26. In order to be able to move the windowpane 22 into the aforementioned positions, a conventional drive is provided, which drive can be an electric motor by way of example.

An actuation mechanism 28 is also provided on the inner side 4 of the motor vehicle wall 2. The actuation mechanism 28 cooperates with the aforementioned drive of the windowpane 22 and can be actuated by an operating element (such as an operator's finger) in order to move the windowpane 22 into the aforementioned positions. In the illustrated first embodiment, the actuation mechanism 28 is arranged on an armrest 30 protruding beyond the inner side 4 of the motor vehicle wall 2, more specifically on the side of the aforementioned armrest 30 pointing upwardly in the vertical direction 16 of the motor vehicle. The actuation mechanism 28 has a touch-sensitive surface 32, which is preferably formed by what is referred to as a touchpad. By way of example, this can be a capacitive, resistive or inductive touchpad, as are already generally known in the art. In any case, a sliding movement of the operating element (e.g., a finger belonging to an operating individual) on the surface 32 can be detected by the touch-sensitive surface 32. The surface 32 in the illustrated embodiment extends substantially in a plane spanned by the transverse directions 12, 14, the forward direction 8 and the reverse direction 10. The actuation mechanism 28 formed in this way cooperates via a control device with the drive of the windowpane 22, as will be explained in greater detail further below.

The actuation mechanism 28 cooperates with the drive of the windowpane 22 in such a way that the windowpane 22, in the event that a sliding movement of the finger over the surface 32 occurring at least in part in a predetermined first movement direction 34 is detected, is moved from the intermediate position or the second end position into the first end position so that the window opening 20 is closed by the windowpane 22. In the illustrated embodiment, the predetermined first movement direction 34 corresponds to the forward direction 8 of the motor vehicle. In addition, the actuation mechanism 28 cooperates with the drive of the windowpane 22 in such a way that the windowpane 22, in the event that a sliding movement of the finger over the surface 32 occurring at least in part in a second movement direction 36, which is opposite the first movement direction 34, is detected, is moved into the second end position starting from the first end position or an intermediate position. Since the second movement direction 36 is opposite the first movement direction 34, this corresponds in the illustrated embodiment to the reverse direction 10 of the motor vehicle. In the event of the above-described movement of the windowpane 22 into the first or second end position, the actuation mechanism 28 also cooperates with the drive via the control device in such a way that the windowpane 22 is still moved into the particular end position even if the contact with the surface 32 or the sliding movement on the surface 32 ends before the particular end position has been reached. An increased operating comfort is achieved, especially since the actuation mechanism 28 does not have to be actuated in a sustained manner by the operating individual in order to move the windowpane 22 into the particular end position. Nevertheless, in the event of the described continued movement of the windowpane 22 once contact with the surface 32 or once the sliding movement on the surface 32 is stopped, it is still possible to stop the windowpane 22 in one of the intermediate positions. The actuation mechanism 28 thus also cooperates with the drive in such a way that, by tapping the surface 32, the windowpane 22 is stopped in one of the intermediate positions between the first and second end position before the particular end position has been reached.

Whereas conventional windowpanes can be moved into the particular end position only at one predetermined speed, the windowpane 22 of the present motor vehicle device can be moved into the particular end position at least at two different speeds. By way of the actuation mechanism 28, not only can the sliding movement as such be detected, but also the sliding speed of the sliding movement of the finger on the surface 32. Here, the actuation mechanism 28 cooperates with the drive of the windowpane 22 in such a way that the windowpane 22, in the event that a first sliding speed is detected, can be moved into the particular end position at a first speed, and, in the event that a second sliding speed, which is greater than the first sliding speed, is detected, can be moved into the particular end position at a second speed, which is greater than the first speed. By way of example, two or more successive sliding speed ranges can be predetermined or defined, each of which is associated with a speed or target speed of the windowpane 22. In addition, the speed of the windowpane 22 can be faster, when the sliding speed of the operating element on the surface is faster. The speed of the windowpane 22 preferably can be adjusted continuously via the sliding speed. In any case, the windowpane 22 should be assigned a limit or maximum speed, however, which is not exceeded even if the sliding speed is even greater.

As already mentioned before, the predetermined first movement direction 34 in the first embodiment according to FIGS. 1 and 2 corresponds substantially to the forward direction 8 of the motor vehicle. In the second embodiment according to FIGS. 3 and 4, the predetermined first movement direction 34 by contrast corresponds substantially to the vertical direction 16 of the motor vehicle upwardly, whereas the predetermined second movement direction 36 corresponds substantially to the vertical direction 18 of the motor vehicle downwardly. For this purpose, the actuation mechanism 28 or touch-sensitive surface 32 thereof is also arranged substantially on the inner side 4 of the motor vehicle wall 2 and is no longer arranged on the armrest 30, such that the touch-sensitive surface 32 extends substantially in a plane spanned by the vertical directions 16, 18, the forward direction 8 and the reverse direction 10. Alternatively, however, the actuation mechanism 28 could also be arranged both on the inner side 4 of the motor vehicle wall 2 and on the side of the armrest 30 pointing upwardly in the vertical direction 16 of the motor vehicle, wherein in this case it is preferred if the touch-sensitive surface 32 extends with a first portion beyond the upper side of the armrest 30 and with a second portion, which is angled relative to the first portion, beyond the inner side 4 of the motor vehicle wall 2. In this embodiment the angled portion on the inner side 4 could serve for the sliding movement in the movement directions 34, 36. The portion on the upper side of the armrest 30 could serve for the aforementioned tapping. For the rest, the second embodiment and indicated variants thereof corresponds substantially to the embodiment according to FIGS. 1 and 2, and therefore like reference signs have been used for like or similar parts and the foregoing description applies accordingly in that regard.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A motor vehicle device comprising:
a movable windowpane moveable into a first end position at a first speed and at a second speed, the second speed greater than the first speed; and
an actuation mechanism having a touch-sensitive surface configured to detect a sliding movement of an operating element on the surface and a sliding speed of the sliding movement, wherein the actuation mechanism cooperates with a drive of the windowpane in such a way that the windowpane is moved into the first end position at the first speed based on a sliding movement occurring at least in part in a predetermined first movement direction detected at a first sliding speed and the windowpane is moved into the first end position at the second speed based on the sliding movement occurring at least in part in the predetermined first movement direction detected at a second sliding speed, the second sliding speed greater than the first sliding speed.

2. The motor vehicle device according to claim 1, wherein the windowpane is movable into a second end position, which is opposite the first end position, wherein the actuation mechanism cooperates with the drive of the windowpane in such a way that the windowpane is moved into the second end position when a sliding movement occurring at least in part in a second movement direction, which is opposite the first movement direction is detected.

3. The motor vehicle device according to claim 1, wherein the actuation mechanism cooperates with the drive in such a way that the windowpane is moved into the first end position even when the contact with the surface or the sliding movement on the surface ends before the first end position has been reached.

4. The motor vehicle device according to claim 3, wherein the actuation mechanism cooperates with the drive in such a way that the windowpane is stopped in an intermediate position before the first end position has been reached by tapping the surface.

5. The motor vehicle device according to claim 1, wherein the speed that the windowpane is moved increases as the sliding speed is faster, wherein the speed of the windowpane is adjusted continuously via the sliding speed up to a maximum speed.

6. The motor vehicle device according to claim 1, wherein the touch-sensitive surface comprises a touchpad.

7. The motor vehicle device according to claim 6, wherein the touchpad is selected from the group consisting of a capacitive touchpad, a resistive touchpad and an inductive touchpad.

8. The motor vehicle device according to claim 1, wherein the windowpane assumes a closed position in the first end position and assumes an open position in the second end position.

9. The motor vehicle according to claim 1, wherein the predetermined first movement direction corresponds substantially to a forward direction of the motor vehicle and the windowpane is movable upwardly in a vertical direction of the motor vehicle into the first end position to form a side windowpane of the motor vehicle.

10. The motor vehicle according to claim 1, wherein the predetermined first movement direction corresponds substantially to a vertical direction of the motor vehicle upwardly and the windowpane is movable upwardly in the vertical direction of the motor vehicle into the first end position to form a side windowpane of the motor vehicle.

11. A method for operating a motor vehicle device having a movable windowpane and an actuation mechanism, the method comprising:
detecting a sliding movement of an operating element on a touch-sensitive surface of the actuation mechanism and detecting a sliding speed of the sliding movement on the surface;
moving the windowpane into a first end position when a sliding movement occurring at least in part in a predetermined first movement direction is detected;
moving the windowpane into a second end position, which is opposite the first end position, when a sliding movement occurring at least in part in a second movement direction opposite the first movement direction is detected;
moving the windowpane into the first end position at a first speed based on the detecting of a first sliding speed; and moving the windowpane into the first end position at a second speed, which is greater than the first speed, based on the detecting of a second sliding speed, the second sliding speed greater than the first sliding speed.

12. The method according to claim 11, further comprising moving the windowpane into the first end position even when contact with the surface or the sliding movement on the surface ends before the first end position has been reached.

13. The method according to claim 12, further comprising stopping the windowpane in an intermediate position before the first end position has been reached by tapping the surface.

14. The method according to claim 11, further comprising moving the windowpane more quickly based on the detecting of a faster sliding speed.

15. The method according to claim 11, further comprising continuously adjusting the speed of the windowpane based on the detecting of the sliding speed, up to a maximum speed as appropriate.

* * * * *